United States Patent
Wu et al.

(10) Patent No.: US 8,260,747 B2
(45) Date of Patent: Sep. 4, 2012

(54) SYSTEM, METHOD, AND COMPUTER PROGRAM PRODUCT FOR ALLOWING ACCESS TO BACKUP DATA

(75) Inventors: Grace Zhanglei Wu, Sunnyvale, CA (US); Michael David Mankovsky, Gilroy, CA (US)

(73) Assignee: NetApp, Inc., Sunnnyvale, CA (US)

( * ) Notice: Subject to any disclaimer, the term of this patent is extended or adjusted under 35 U.S.C. 154(b) by 359 days.

(21) Appl. No.: 12/366,555

(22) Filed: Feb. 5, 2009

(65) Prior Publication Data
US 2010/0198791 A1    Aug. 5, 2010

(51) Int. Cl.
*G06F 17/30* (2006.01)
(52) U.S. Cl. .................. 707/644; 707/649
(58) Field of Classification Search .......... 707/644, 707/649
See application file for complete search history.

(56) References Cited

U.S. PATENT DOCUMENTS
6,785,786 B1    8/2004   Gold et al.
7,085,904 B2 *  8/2006   Mizuno et al. ............... 711/162
2004/0030852 A1   2/2004  Coombs et al.
2005/0223277 A1  10/2005  Ballard
2006/0206544 A1 * 9/2006  Oks et al. .................... 707/204

OTHER PUBLICATIONS

International Written Opinion and Search Report from PCT Application No. PCT/US10/00347 mailed on Jun. 9, 2010.

* cited by examiner

*Primary Examiner* — Amy Ng
*Assistant Examiner* — Alexander Khong
(74) *Attorney, Agent, or Firm* — Zilka-Kotab, PC

(57) ABSTRACT

A system, method, and computer program product are provided for allowing access to backup data resulting from performance of one or more recovery point backup operations and one or more full backup operations. This is accomplished by associating recovery point backup operations with full backup operations and allowing access to backup data resulting from performance of the recovery point backup operations and the full backup operations. In this way, logs corresponding to the backup operations may be associated with a backup path, such that the logs may be accessed during a restore operation. Furthermore, the recovery point operations may be configured to provide a user defined granularity for data recovery. To this end, in various embodiments, backup data may be stored at a granularity defined by a user and recovered based on a user selection of a recovery point.

28 Claims, 15 Drawing Sheets

SnapManager for Exchange - Backup

Backup to restore from:

SG2, exchsnap__SNAPMGR-50_05-08-2008_19.08.24, run verification

Selected Exchange Server:
SNAPMGR-50

You can select the date and start time and end time within that date. The available recovery point will be displayed once you click on the Refresh button.

Scope for Recovery Point Selection

Date: 5/ 8/2008    Start Time: 7:08:24 PM    End Time: 11:59:24 PM

Available Recovery Points 05-08-2008_19.08.58 --- E0100000184
05-08-2008_19.09.03 --- E0100000185
05-08-2008_19.16.53 --- E0100000186
05-08-2008_19.16.59 --- E0100000187

To select a recovery point, please highlight one in the list and click on OK.

Refresh    OK    Cancel

FIGURE 10

SYSTEM, METHOD, AND COMPUTER PROGRAM PRODUCT FOR ALLOWING ACCESS TO BACKUP DATA

FIELD OF THE INVENTION

The present invention relates to data backup and, more specifically, to a technique for allowing access to backup data resulting from performance of recovery point backup operations and full backup operations.

BACKGROUND

In the context of data storage, the term "backup" refers to making copies of data such that the additional copies may be used to restore original data after a data loss event. These additional copies are typically called "backups." Backups are useful for various purposes. For example, the backups may be used to restore a state following a disaster (i.e. disaster recovery). Additionally, the backups may be used to restore small numbers of files after the files have been accidentally deleted or corrupted.

To date, data recovery utilizing backups has been limited to accessing backup data corresponding to a single backup path. For example, backing up data recovered using a particular backup may render other backup data not associated with the particular backup useless. By electing to recover data from a particular backup, any other backup data associated with a different backup operation will be rendered useless, as a backup path has already been selected for recovery. Thus, when more than one backup path has been created, backup data may only be recovered from one of the backup paths. This limits the recovery options available once a particular backup is utilized.

There is thus a need for addressing these and/or other issues associated with the prior art.

SUMMARY

In order to address issues associated with the prior art, a system, method, and computer program product are provided for allowing access to backup data resulting from performance of one or more recovery point backup operations and one or more full backup operations. This is accomplished by associating recovery point backup operations with full backup operations and allowing access to backup data resulting from performance of the recovery point backup operations and the full backup operations. In this way, logs corresponding to the backup operations may be associated with a backup path, such that the logs may be accessed during a restore operation. Furthermore, the recovery point operations may be configured to provide a user defined granularity for data recovery. To this end, in various embodiments, backup data may be stored at a granularity defined by a user and recovered based on a user selection of a recovery point.

In various embodiments, the invention may be implemented on a server or client system. For example, the invention may reside in a storage system of a client and/or server system.

In one exemplary embodiment, data to backup is identified. Additionally, one or more full backup operations are performed on the data. Furthermore, one or more recovery point backup operations are performed on a new portion of the data. Still yet, the one or more recovery point backup operations are associated with at least one of the one or more full backup operations. Moreover, access is allowed to backup data resulting from performance of the one or more recovery point backup operations and the one or more full backup operations. In addition, the backup data is output.

BRIEF DESCRIPTION OF THE DRAWINGS

FIG. 10 illustrates an interface for selecting a recovery point, in accordance with one embodiment.

DETAILED DESCRIPTION

A system, method, and computer program product are provided for allowing access to backup data resulting from performance of one or more recovery point backup operations and one or more full backup operations. This is accomplished by associating recovery point backup operations with full backup operations and allowing access to backup data resulting from performance of the recovery point backup operations and the full backup operations. In this way, logs corresponding to the backup operations may be associated with a backup path, such that the logs may be accessed during a restore operation. Furthermore, the recovery point operations may be configured to provide a user defined granularity for data recovery. To this end, in various embodiments, backup data may be stored at a granularity defined by a user and recovered based on a user selection of a recovery point.

In one exemplary embodiment, data to backup is identified. Additionally, one or more full backup operations are performed on the data. Furthermore, one or more recovery point backup operations are performed on a new portion of the data. Still yet, the one or more recovery point backup operations are associated with at least one of the one or more full backup operations. Moreover, access is allowed to backup data resulting from performance of the one or more recovery point backup operations and the one or more full-backup operations. In addition, the backup data is output.

Figure 1:
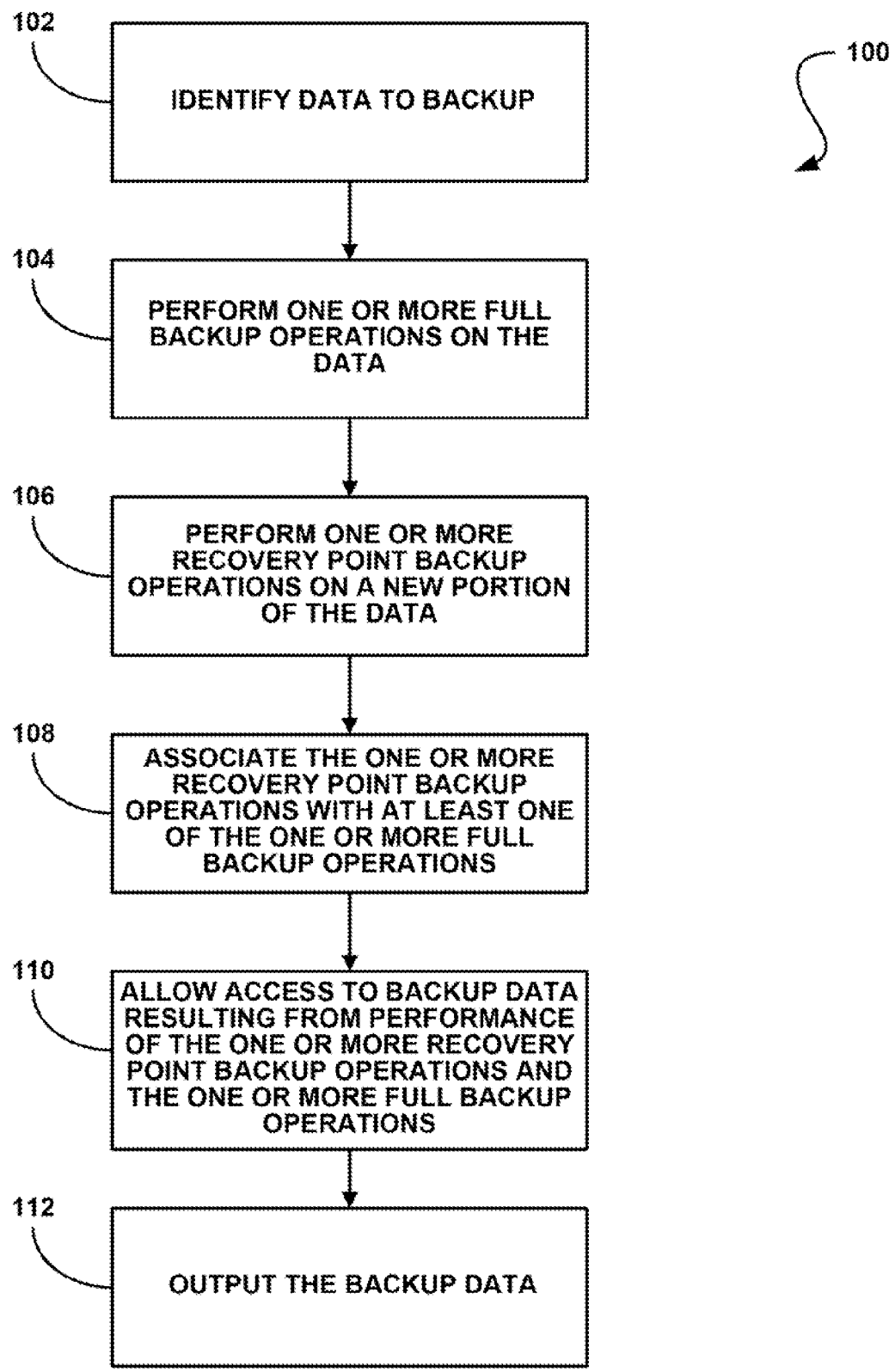
FIG. 1 illustrates a method for allowing access to backup data resulting from performance of one or more recovery point operations and one or more full backup operations, in accordance with one embodiment.

FIG. 1 illustrates a method 100 for allowing access to backup data resulting from performance of one or more recovery point operations and one or more full backup operations, in accordance with one embodiment. As shown, data to backup is identified. See operation 102.

The data may include any type of data capable of being backed up (e.g. client data, metadata, etc.). In one embodiment, the data to be backed up may include any type of Exchange data. For example, the data may include database files, transaction log files, and/or Exchange system files. As an option, the data may include Exchange Mail Store and Public Folders (i.e. user accounts). In another embodiment, the data may include email messages (e.g. storage group log files, etc.).

Additionally, one or more full backup operations are performed on the data. See operation 104. In the context of the present description, a full backup operation refers to any data backup operation capable of storing a copy of data in databases, logs (e.g. transaction logs, etc.), and system files. In one embodiment, the full backup operation may include truncating the log files up to a checkpoint.

Furthermore, one or more recovery point backup operations are performed on a new portion of the data. See operation 106. In the context of the present description, a recovery point backup operation refers to any backup operation capable of storing transaction logs and data associated with the transaction logs (e.g. metadata, etc.).

Furthermore, the new portion of the data may include any data that is stored after the most recent full backup operation that occurred before a current recovery point backup operation or any data that is stored after the most recent recovery point backup operation that occurred before the current recovery point backup operation.

In one embodiment, the recovery point backup operation may only create and store logs associated with new data. In this case, the new data may include any new data present since the performance of a corresponding full backup operation. For example, the new data may include changes, additions, and/or deletions to data corresponding to a full backup operation.

Additionally, the one or more recovery point backup operations may be performed at predefined time intervals. As an option, the predefined time intervals may be defined by a user. As another option, the one or more recovery point backup operations may be performed automatically, based on changes made to the data. In either case, the number of the recovery point backup operations to be performed may defined by a user.

Still yet, the one or more recovery point backup operations are associated with at least one of the one or more full backup operations. See operation 108. In this case, associating the one or more recovery point backup operations with at least one of the one or more full backup operations may include associating a pass identifier with each of the one or more recovery point backup operations.

In the context of the present description, a pass identifier refers to any identifier capable of being used to associate a particular recovery point backup operation, or data associated therewith, with one of the full backup operations, or data associated therewith. In one embodiment, the pass identifier may identify a path in a data structure associated with a particular series of backup operations. The pass identifier may indicate one of the full backup operations corresponding to the one or more recovery point backup operations.

Furthermore, the pass identifier may be utilized to allow access to the backup data. As an option, the pass identifier may include metadata for associating the one or more recovery point backup operations with at least one of the one or more full backup operations.

Moreover, access is allowed to backup data resulting from performance of the one or more recovery point backup operations and the one or more full backup operations. See operation 110. For example, the backup data may be generated by performing the one or more recovery point backup operations and/or the one or more full backup operations. Subsequently, a recovery operation may be performed as a result of data loss, corruption, or failure. In this case, the performance of the recovery operation may enable access to the backup data by recovering the backup data. Furthermore, the recovery operation may be a user initiated operation. As an option, a user may initiate a recovery operation using a recovery program (e.g. software).

In one embodiment, this recovery operation may include a point in time recovery operation. In other words, backup data may be accessed based on a desired point in time for recovery. In another embodiment, the recovery operation may allow access to a backup state. For example, access may be allowed to a state corresponding to a full backup, a recovery point backup, and/or any log or data associated therewith.

In either case, as an option, the backup data to be accessed may be defined by a user. For example, the user may define the data to be accessed (e.g. prior to a recovery operation, etc.) utilizing a user interface. Furthermore, allowing access to the backup data may include allowing access to the first subsequent FRP backup data created before second subsequent FRP backup data, where the first FRP backup data and the second FRP backup data are associated with different full backup operations. For example, the first backup data may be associated with a first full backup operation and the second backup data may be associated with a second full backup operation. In this way, data recovery is not limited to only backup data in a particular series of backup operations.

It should be noted that allowing access to the backup data may include allowing the data to be recovered. Additionally, allowing access to the backup data may include transferring the backup data from a backup storage location to a storage location that is not necessarily used for backup data. Furthermore, allowing access to the backup data may include allowing the backup data to be read or copied.

Once the backup data is accessed, the backup data may be output. See operation 112. In this case, the backup data may be output to a memory location, a database, a file, a display, and/or any other location. In one embodiment, at least a portion of the backup data may be output such that the portion is displayed to a user. In one embodiment, outputting the data may include restoring the data. As option, the backup data may be stored in a data structure embodied on a tangible computer readable medium (e.g. a disk, a hard drive, volatile or nonvolatile memory, etc.).

In one exemplary implementation, a full backup operation may be performed on both databases and transaction logs. Subsequently, one or more recovery point backup operations may be performed only on newly generated transaction logs. In this case, the new data are the logs that are generated after the performance of the full backup operation. Furthermore, the new data may be logs that are generated after a previous recovery point backup operation, if the previous recovery point operation was performed after the full backup operation. Data recovery may then be allowed from the backup data resulting from performance of full backup operation and one or more recovery point backup operations. In this case, data recovery refers to recovering the backup data to a state that the data was in before a backup operation was performed on the data.

In another exemplary implementation, an association may be generated between one or more recovery point backup operations and at least one full backup operation. The association information may then be stored in a file. Backup data corresponding to a user selected backup point may then be retrieved based on the association information saved in the file. Furthermore, a storage system may be restored in accordance with the user selected backup point by transferring the backup data from a backup storage location to the Exchange live system.

More illustrative information will now be set forth regarding various optional architectures and features of different embodiments with which the foregoing technique may or may not be implemented, per the desires of the user. It should be strongly noted that the following information is set forth for illustrative purposes and should not be construed as limiting in any manner. Any of the following features may be optionally incorporated with or without the other features described.

Figure 2:
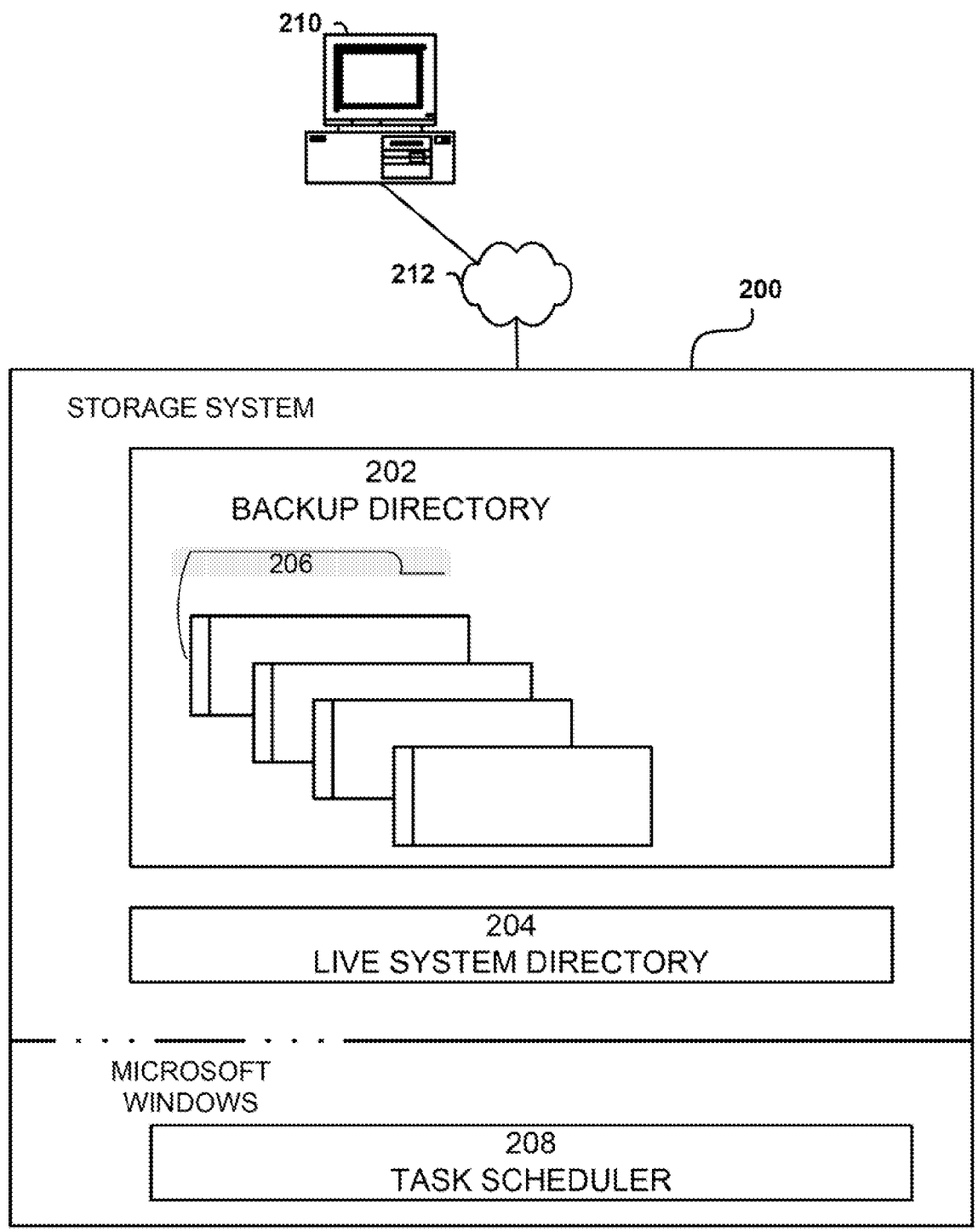
FIG. 2 illustrates a system for allowing access to backup data resulting from performance of one or more recovery point operations and one or more hill backup operations, in accordance with one embodiment.

FIG. 2 illustrates a storage system 200 for allowing access to backup data resulting from performance of one or more recovery point operations and one or more full backup operations, in accordance with one embodiment. As an option, the storage system 200 may be implemented to carry out the functionality of FIG. 1. Of course, however, the storage system 200 may be implemented in any desired environment. It should be noted that the definitions provided above equally apply to the present description.

As shown, the storage system 200 may be in communication with a user system 210. As an option, the storage system 200 may be in communication with the user system 210 over one or more networks 212. In this case, the user system 210 may represent any system capable of communicating with the storage system 200 (e.g. a desktop computer, laptop computer, etc.).

As an option, the user system 210 may be utilized to access and implement functionality associated with the storage system 200. For example, a user (e.g. an administrator, etc.) may utilize the user system 210 to schedule fill data backup operations and frequent recovery point (FRP) backup operations. Furthermore, the storage system 200 may be utilized by the user to store data (e.g. backup and other data, etc.).

To ensure a high level of data protection, the storage system 200 may utilize software capable of being executed by a processor (e.g. a processor associated with the storage system 200 and/or user system 210, etc.) to asynchronously replicate newly generated transaction logs to a backup directory 202 at scheduled intervals between the full database backups as part of a frequent recovery point backup operation. In one embodiment, two copies of a log file may be retained. For example, one copy may be stored in a live system directory 204 and one copy may be stored inside the backup directory 202 as a backup if hardlink technology is not used.

In one embodiment, invoking a full backup or an FRP backup operation may create a folder 206 under the backup directory 202 on the storage system 200, the same as in a full backup operation, using a unique naming convention. This folder 206 may store all the replicated transaction logs since the last full backup or the last FRP backup up to the next FRP backup. In this way, there may not be any duplicated logs that are part of an FRP backup. Additionally, the storage system 200 may trace which transaction logs to copy over in each backup utilizing a software application. As an option, a pass identifier may be utilized to trace which transaction logs to copy over in each backup.

In one embodiment, a task scheduler 208 (e.g. a Windows Task Scheduler, etc.) may be utilized to execute the FRP backup operation. As an option, the FRP backup operation may be configured to run only after a full backup has been created. In this case, if no full backup has ever been created, the FRP backup operation may fail with the ERROR type of event showing a detailed message in a status window, report, and/or a Windows event log.

In various embodiments, the FRP backup operations may be performed based on different criteria. For example, in one embodiment, the FRP backup operation may be a time driven FRP backup operation. In this case, a user may be provided with an option to fine-tune FRP backup behavior to match business requirements and operating environments. In one embodiment, this option for specifying how often the FRP backup operation will run may be presented on an FRP backup view/wizard interface, as advanced settings, and/or in a command line form.

In another embodiment, the FRP backup operation may be a data driven FRP backup operation. For example, a data driven FRP backup operation may be triggered by a data change in one or more log files. In this case, the FRP backup may be triggered based on real-time or near real-time changes. As another option, a number of newly closed log files may be a trigger point for the data driven FRP backup operation. In one embodiment, a minimum or maximum frequency of FRP backups may also be defined (e.g. specified by an administrator, etc.) such that FRP backups occur frequent enough but do not occur too frequently. In any of these cases, the FRP backup may be triggered automatically utilizing software. As another option, a user may trigger an FRP backup operation.

In one embodiment, all the FRP backups between two full database backups may be retained for restoration in order to implement a point-in-time restore ability. To protect the data loss on replicated transaction logs, a snapshot of the LUN (logic unit numbers) associated with backed logs may be created at the end of an FRP backup and the snapshot created by the previous FRP backup may be deleted. In this case, the FRP backup operation may not truncate any logs such that the logs backed up by FRP backup may still exist in the live system directory 204. The replicated data in the backup directory 206 may function to provide data protection to the granularity of point-in-time restore to a particular transaction log if LUNs associated with the live logs are corrupt. Each of the FRP backups may use a naming convention that includes date/time information (e.g. 03-14-2007_09.30.00, etc.).

The FRP backups may enable restoration of data to within the specified time interval of a data loss event. In an up-to-the-minute restore, the storage system 200 may use software to play forward all of the logs in the FRP backups and full backups that were created since the backup to be restored, along with the existing transaction logs in the live system directory 204.

As an option, in a point-in-time restore, the log file name and an associated closing time may be displayed to a user. The user (e.g. an administrator, etc.) may then choose to restore databases up to the point of time when the log file was closed. The database may then be restored from the previous full backup and the logs in subsequent FRP backups may be replayed up to that specified time.

It should be noted that, in most cases, verification (including database integrity verification and transaction log consistent verification) may take a long time and generate heavy I/O for a server. Thus, in one embodiment, the FRP backups may be configured such that log verification is not performed and is deferred to the next full backup. Additionally, as an option, similar to a full database backup, the FRP backup may also generate a report with all types of information regarding the backup.

By implementing FRP backups, data loss may be minimized. Data may be recovered in the event of data loss or system corruption to the last FRP backup. A user may restore the last full database backup along with restoration of all subsequent FRP backups.

For example, an hourly full backup may be performed at 8:00 a.m. and an FRP backup may be performed every 15 minutes between the full backups (e.g. at 8:15 a.m. and 8:30 a.m., etc.). If at 8:35 a.m., some log files were lost or corrupted, a user may restore the 8:00 a.m. full backup and play forward the logs in 8:15 a.m. and 8:30 a.m. FRP backups to recover the data up to 8:30 a.m.

Additionally, users may be allowed to restore the database up to a particular log file. For example, the user may restore the last full database backup and play forward all the logs from the subsequent FRP backups within the specified range (e.g. a user specified range, etc.).

Table 1 shows a data structure for tracing transaction logs, in accordance with one embodiment.

TABLE 1

Snapshot Information

```
|-EXCH_SNAPMGR-32
| |
| |-SG_SG1
| | |
| | |-03-14-2007_08.00.00 ← full backup
| | | |-SnapInfo_03-14-2007_08.00.00.sme
| | | |-Vss_03-14-2007_08.00.00.xml
| | | |-Vss_03-14-2007_08.00.00_{ . . . }.xml
| | | |-Logs
| | | | |-E0000001.log
| | | | |-E0000002.log
| | | |
| | |-03-14-2007_08:15.00 ← FRP backup
| | | |-Logs
| | | | |-E0000003.log
| | | | |-E0000004.log
| | | | |-E0000005.log
| | |-03-14-2007_08:30.00 ← FRP backup
| | | |-Logs
| | | | |-E0000006.log
| | | | |-E0000007.log
| | |-03-14-2007_08:45.00 ← FRP backup
```

TABLE 1-continued

```
| | | |-Logs
| | | | |-E0000008.log
| | | |
| | |-03-14-2007_09:00.00 ← full backup
| | | |-SnapInfo_03-14-2007_09.00.00.sme
| | | |-Vss_03-14-2007_09.00.00.xml
| | | |-Vss_03-14-2007_09.00.00_{ . . . }.xml
| | | |-Logs
| | | | |-E0000009.log
| | | | |-E000000A.log
| | | |
| | |-03-14-2007_09:15.00 ← FRP backup
| | | |-Logs
| | | | |-E000000B.log
| | | | |-E000000C.log
| | |-03-14-2007_09:30.00 ← FRP backup
| | | |-Logs
| | | | |-E000000D.log
| | | | |-E000000E.log
| | | | |-E000000F.log
| | | |
| | |-SG-SG2
| | | |
```

As shown in Table 1, the hourly full backup was performed at 8:00 a.m., 9:00 a.m., etc. The FRP backup was performed every 15 minutes between the full backups at 8:15 a.m., 8:30 a.m., 8:45 a.m., 9:15 a.m., etc. If at 10:00 a.m. an administrator noticed that a virus was encountered at 8:55 a.m. and invaded the log files, the administrator may choose to recover the database to a state of the database at 8:45 a.m., when the previous FRP backup was created. Furthermore, in the case of a disasters a user may restore the last full database backup and all the subsequent FRP backups from a mirrored destination server to the recovery server.

It should be noted that the storage system 200 may include any system capable of storing data and implementing backup operations. Furthermore, the storage system 200 may represent a client or a server system. Additionally, the storage system 200 may be in communication with one or more other systems and/or storage units over one or more networks.

Figure 3A:
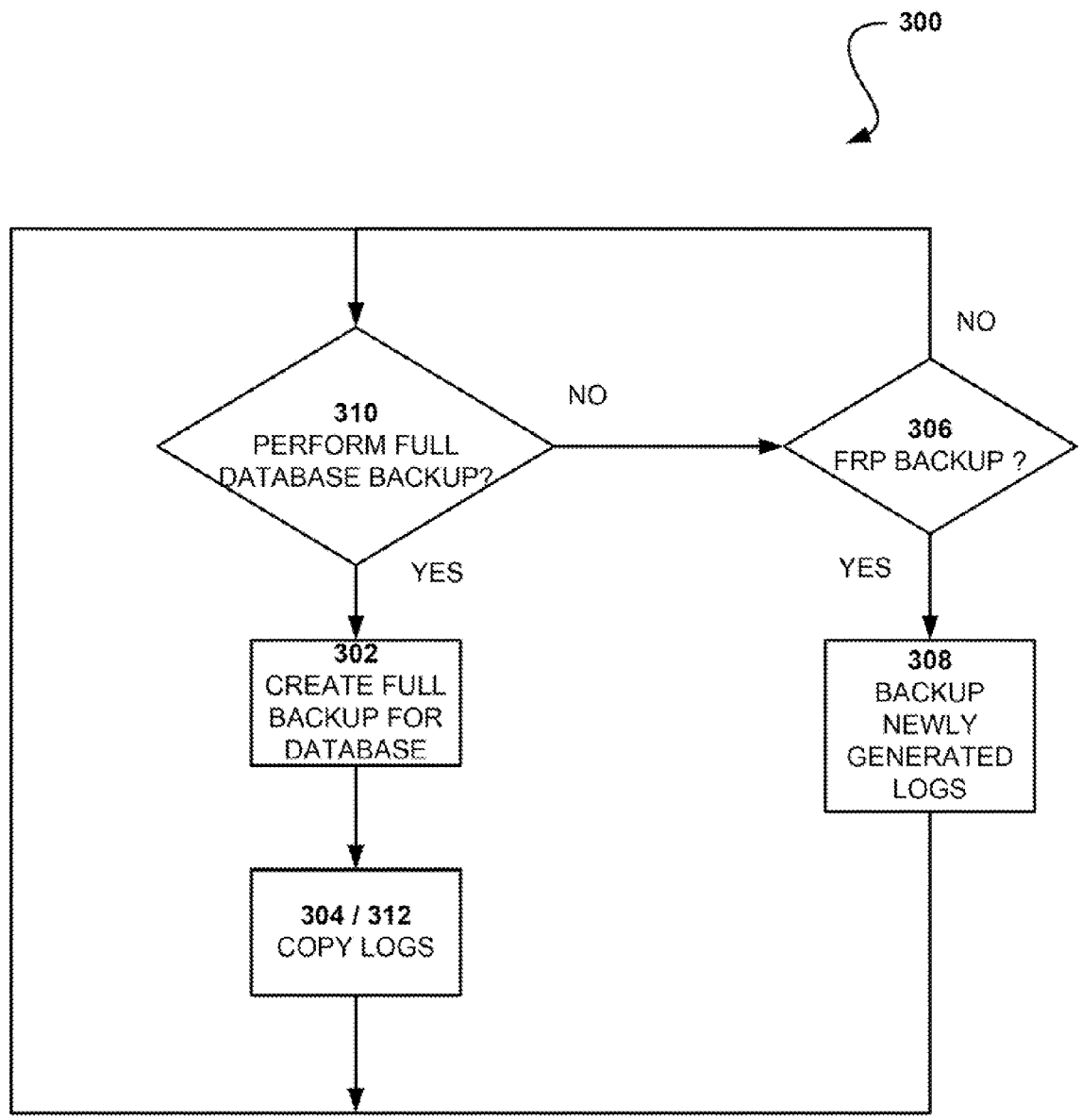
FIG. 3A illustrates a method for allowing access to backup data resulting from performance of one or more recovery point operations and one or more full backup operations, in accordance with another embodiment.

FIG. 3A illustrates a method 300 for allowing access to backup data resulting from performance of one or more recovery point operations and one or more full backup operations, in accordance with another embodiment. As an option, the method 300 may be implemented in the context of the details of FIGS. 1-2. Of course, however, the method 300 may be implemented in any desired environment. Again, the definitions provided above equally apply to the present description.

As shown, a full backup is to back up databases first. See operation 302. As part of the full backup, transaction logs are copied from Microsoft Exchange server live system. See operation 304. At the end of full backup, the committed logs may be truncated from the server live system.

As part of the full backup, all available logs may be copied. It is then determined whether an FRP backup is to be performed. See operation 306. New logs generated after the full backup may be backed up in the following FRP backup which may be run at specified interval.

In this case, it may be determined whether an FRP backup is to be performed based on a time parameter (e.g. a timed FRP backup setting, etc.), a log status parameter (e.g. a flag indicating data has changed, etc.), and/or other parameters. As an option, a user may create a backup schedule for performing FRP backups. Furthermore, each recovery point backup operation may be performed after an associated full backup operation. For example, after the performance of a full backup operation, FRP backups may be performed and may be associated with these full backup operations (e.g. utilizing metadata, etc.).

If it is determined that an FRP backup is to be performed, any newly generated logs are copied. See operation 308. The newly generated logs may include any logs generated since the last full backup was performed or since a last FRP backup was performed. Furthermore, the copies of the newly generated logs may be associated with a corresponding full backup operation.

It is then determined whether a full backup is to be performed. See operation 310. Similar to the FRP backup, it may be determined that a full backup is to be performed based on a time parameter (e.g. a user defined time parameter, etc.) and/or based on a data parameter (e.g. a size, time, and/or type of modified data, etc.).

If it is determined that a full backup is to be performed, all logs are copied as part of the full backup operation. See operation 312. In this case, the logs may include all new committed logs and uncommitted logs. Furthermore, a snapshot of all the storage group databases and transaction logs may be stored as part of the full backup operation. Additionally, as an option and as part of the full backup operation, log files up to a checkpoint may be truncated by Exchange.

In one embodiment, the full backup may create a snapshot of data using a naming convention including server information, and a timestamp (e.g. "eloginfo_<server>_<timestamp>", "exchsnap_<server>_<timestamp>" etc.). In this case, if the FRP backup uses the same prefix in the same naming convention as full backup, it may be difficult to identify whether the snapshot is created by the full backup or the FRP backup using only the name. This may also render a previous snapshot FRP backup hard to find for deletion.

Accordingly, in one embodiment, a different prefix (e.g. "efrpingo," etc.) may be used in the snapshot name for the FRP backup. After the copying of all the logs, the FRP backup operation may create a new snapshot of the data using this naming convention and delete the older snapshots. In this way, available recovery points may be retrieved in the specified date and time frame for data (e.g. a storage group, etc.) based on a selected backup.

In one embodiment, every time a point-in-time (PIT) restore is performed, an xml file (e.g. "SG_<SGName>_PIT.xml," etc.) including the restored backup name may be created, or updated if it exists, at a storage group level. This file may be used to keep track of the last restored backup of the storage group. Additionally, an exclusive-backup list file (e.g. "PITInfo_<timestamp>.xml," etc.) may be created under the restored full backup. This file may include a list of backups that may be excluded from future PIT restores. In this case, the exclusive-backup list may be used for a full backup.

Figure 3B:
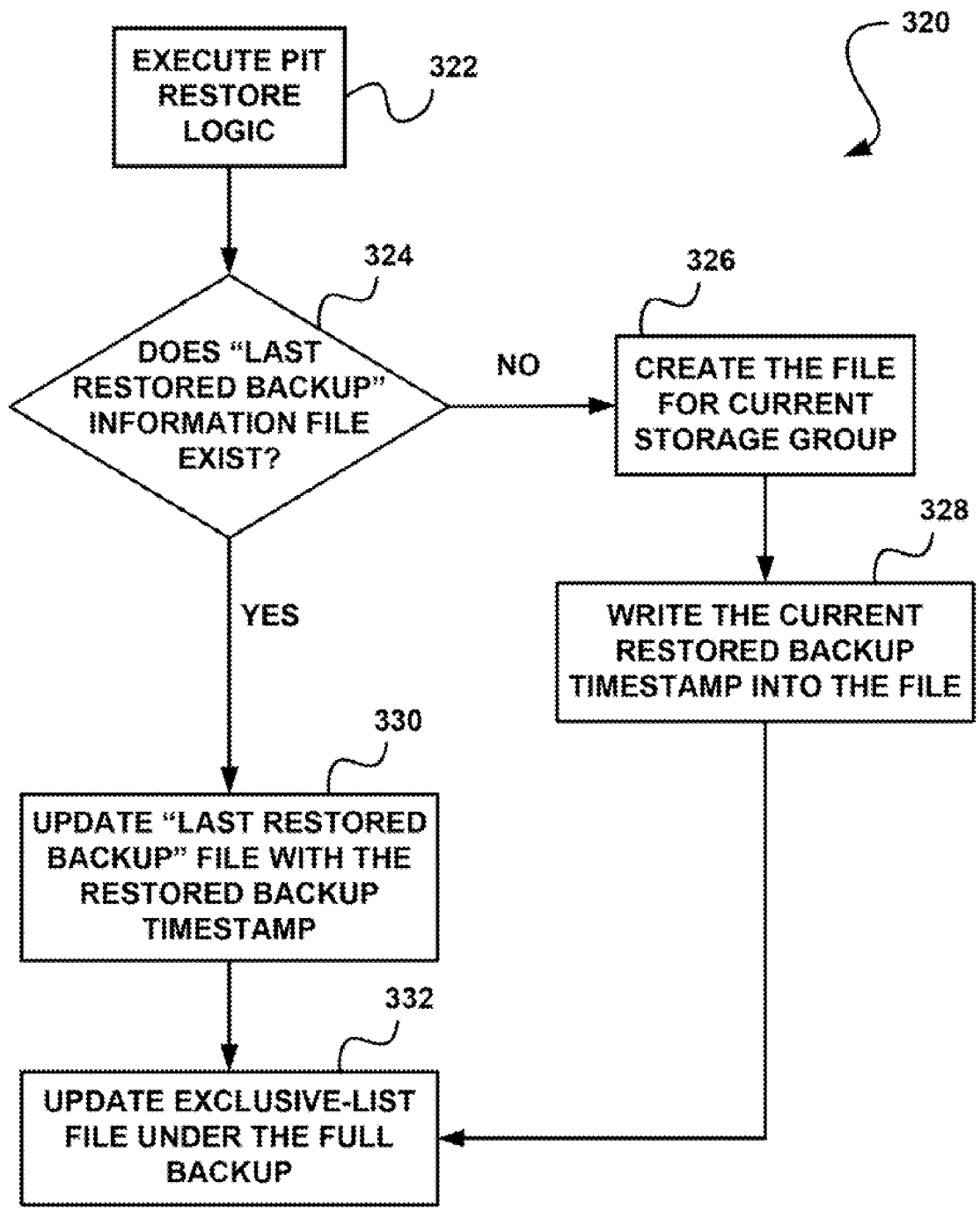
FIG. 3B shows a method that may be implemented in the context of point-in-time (PIT) restore logic for updating an exclusive-list file under the full backup, in accordance with one embodiment.

FIG. 3B shows a method 320 that may be implemented in the context of PIT restore logic for updating an exclusive-list file under the full backup, in accordance with one embodiment.

As shown, it is determined whether a "Last restored backup" information file exists at the end of executing PIT restore logic for updating an exclusive-list file under the full backup. See operations 322-324. If the "Last restored backup" information file does not exist, the file is created for a current storage group and the current restored backup timestamp is written to the file. See operation 326-328.

If the "Last restored backup" information file does exist, the "Last restored backup" file is updated with the restored backup timestamp. See operation 330. Additionally, the exclusive-list file is updated under the full backup. See operation 332.

In this example, during the next backup, the "Last restored backup" information may be retrieved and saved in the exclusive-list file of the new backup. The "Last restored backup" information of a backup may be used to determine if the backup should be included in the list for retrieval of recovery points when an attempt to restore a backup is raised.

In one embodiment, to retrieve a recovery point for a full backup, all the backups following this backup may be triaged, the backups in the exclusive list may be excluded, and the backups from the same backup path where no PIT restore occurred in between may be included. In this case, if there are common logs in two backups, the backup from the later backup may be utilized.

Figure 3C:
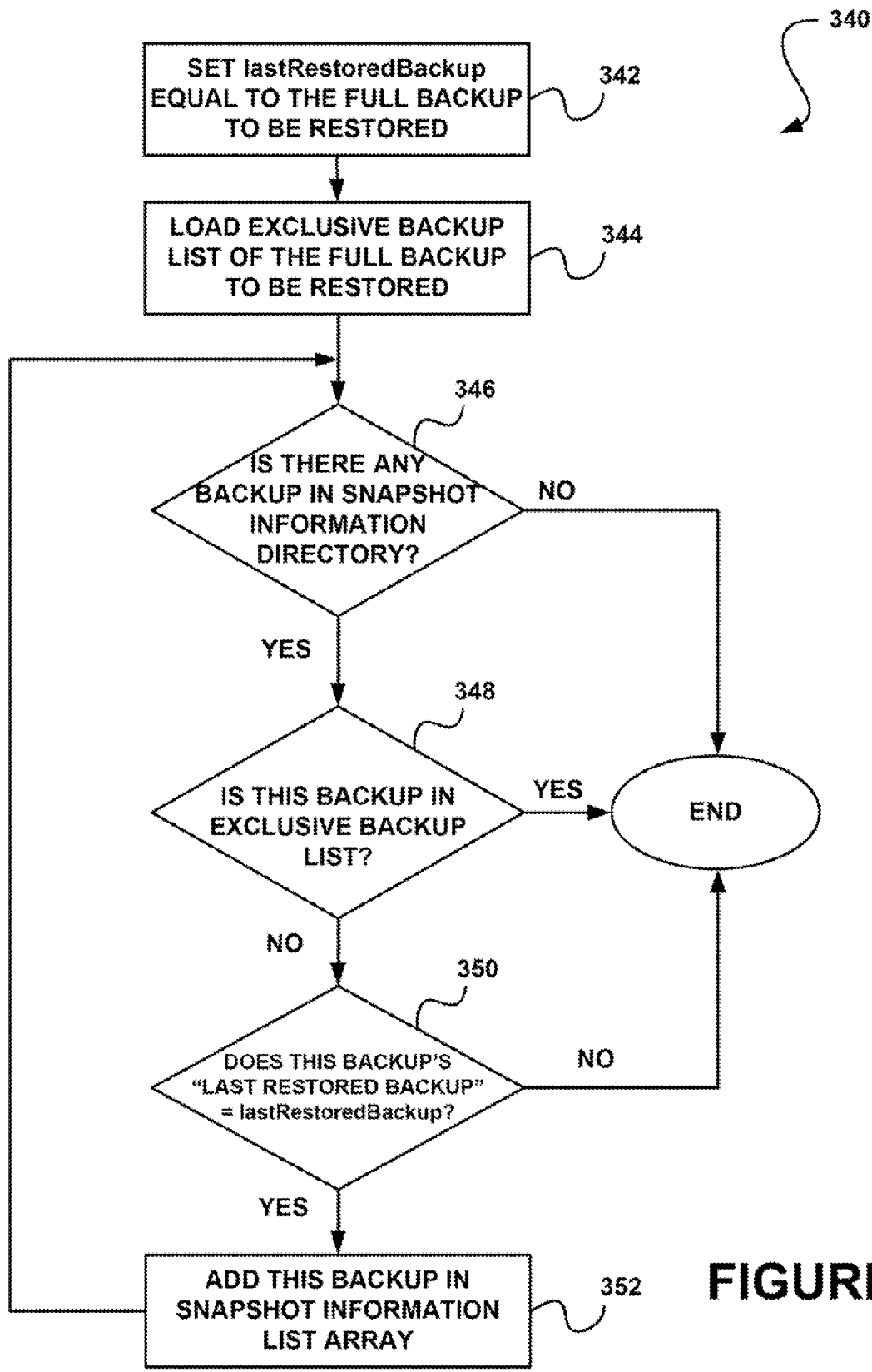
FIG. 3C shows a method for retrieving a recovery point for a full backup, in accordance with one embodiment.

FIG. 3C shows a method 340 for retrieving a recovery point for a full backup, in accordance with one embodiment. As shown, a variable indicating the last restored backup (e.g. "lastRestoredBackup," etc.) is set to be equal to the full backup to be restored. See operation 342. An exclusive backup list of the full backup to be restored is then loaded. See operation 344.

It is then determined if a backup exists in a snapshot information directory. See operation 346. For each backup in the directory, it is determined whether the enumerated backup is in the exclusive backup list. See operation 348. If the enumerated backup is not in the list, it is determined whether the enumerated backups "Last restored backup" indicator is equal to the variable indicating the last restored backup. See operation 350. If it is, this backup is added in a snapshot information list array. See operation 352. It is then determined whether there is another backup in the snapshot information directory. This process occurs for all backups in the snapshot information directory.

As an example of how point-in-time restore may be utilized to retrieve recovery points, four backups may be considered (e.g. bkup1-bkup4). It may be determined to restore to "bkup2" (e.g. by an administrator, etc.). After the restore to bkup2, a fifth backup, bkup5, may be created. Table 4 shows an illustration of this scenario, in accordance with one embodiment.

TABLE 2

| bkup1 | bkup2 | bkup3 | bkup4 |
|---|---|---|---|
| (1, 2) | (3, 4) | (5, 6, 7) | (8, 9) |
| \ | | bkup5 | |
| | | (3, 4, 5, . . . ) | |

In this case, each of the backups include logs (e.g. logs 1,2,3, etc.). In this example, bkup5 includes the same log file name as in bkup3. However, these logs may be different files (i.e. different log data).

Once a backup is restored, a new restore path may be created. In this case, all of the backups following the restore point (e.g. bkup3 and bkup4 in this case) may be placed into the exclusive list of the restored backup (i.e. bkup2). The recovery points will be available from the new path. Additionally, bkup3 and/or bkup4 may also be chosen as a restore point. Any other new restore path may be created accordingly.

Table 3 shows the backup flow illustrated in Table 2 with additional backups and an additional restore path, in accordance with one embodiment.

TABLE 3

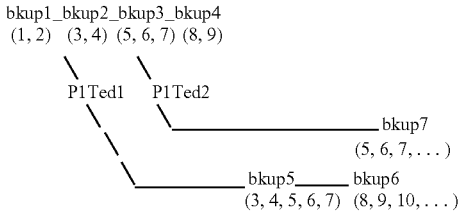

Figure 4:
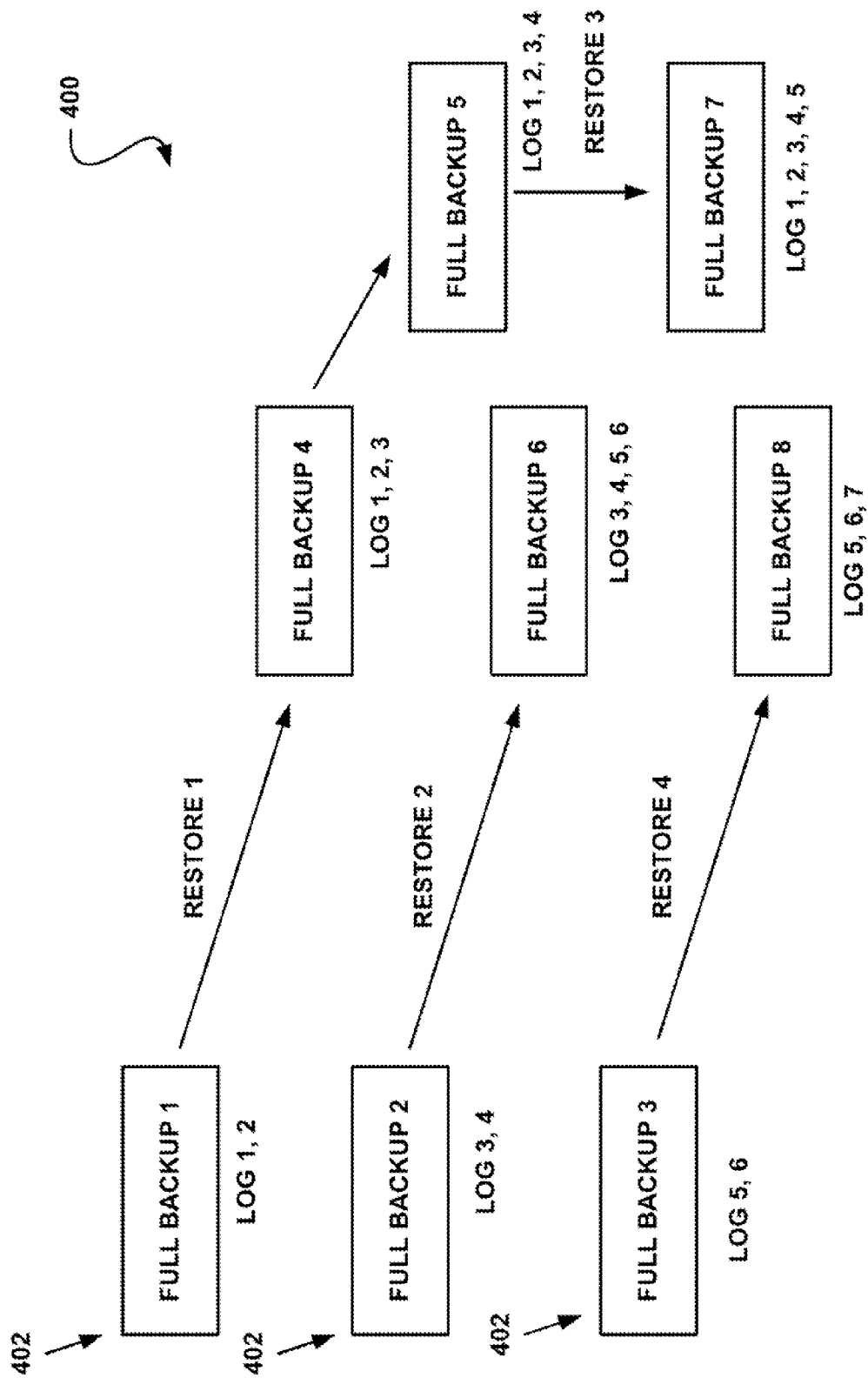
FIG. 4 illustrates a backup configuration flow for allowing access to backup data resulting from performance of one or more recovery point operations and one or more full backup operations, in accordance with one embodiment.

FIG. 4 illustrates a backup configuration flow 400 for allowing access to backup data resulting from performance of one or more recovery point operations and one or more full backup operations, in accordance with one embodiment. As an option, the backup configuration flow 400 may be viewed in the context of the details of FIGS. 1-3. Of course, however, the backup configuration flow 400 may be implemented in any desired environment. Further, the definitions provided above equally apply to the present description.

As shown, a plurality of full backups 402 are performed (e.g. utilizing software executed by a processor, etc.). In this case, the full backups 402 are performed on a timed basis where Full Backup 1 refers to a first full backup that was performed before a second full backup, Full Backup 2, which was performed before a third full backup, Full Backup 3. At some point (e.g. at a time after the performance of three full backups, etc.), a user may desire to restore data associated with the full backups 402. For example, a user may choose to restore to Full Backup 1. After the restore operation, a fourth full backup, Full Backup 4, is created.

In this case, the Full Backup 4 will include data associated with the Full Backup 1 (e.g. logs 1, 2, etc.) and any new data (e.g. log 3, etc.). After the creation of the Full Backup 4, a fifth full backup, Full Backup 5, may be initiated (e.g. based on a time setting, etc.). The Full Backup 5 will include all untruncated data associated with the Full Backup 4 (e.g. logs 1, 2, 3, etc.) and any new data (e.g. log 4, etc.).

At this point, the user may desire to again restore the data. In this case, the user may desire to restore the data from the Full Backup 2. After the second restore, a sixth full backup, Full Backup 6, may be initiated. The Full Backup 6 will include all data associated with the Full Backup 2 (e.g. logs 3, 4, etc.) and any new data (e.g. logs 5, 6, etc.). Thus, after restoring data to a first full backup state (e.g. Full Backup 1, etc.) and performing one or more subsequent full and FRP backups, a second full backup state (e.g. Full Backup 2, etc.) or an associated FRP backup, in a path separate from the first full backup state, may be accessed.

It should be noted that, FRP backups may be performed at any point after a full backup. Furthermore, these FRP backups may each be associated with a full backup. Additionally, although FIG. 4 shows logs with the same name at different full backup stages, these logs with the same name may not necessarily include the same data.

For example, the Full Backup 4 associated with the first restore path may include "Log 3." Furthermore, the Full Backup 2 may include a different "Log 3," where the Full Backup 2 is located in a separate restore path that the Full Backup 4. Thus, both of the Log 3s may be associated with their respective restore path and/or full backup state to distinguish the logs. In one embodiment, this association may be accomplished utilizing a pass identifier (e.g. meta data, etc.).

Using the pass identifier, any FRP backup, full backup, and/or data associated therewith may use the pass identifier to maintain an association with an originating path and/or a restore path. For example, Logs 4 and 5 associated with the Full Backup 6 may be logs stored as part of an FRP backup. The FRP backup and the associated logs may utilize a pass identifier to maintain an association with the Full Backup 6.

Figure 5:
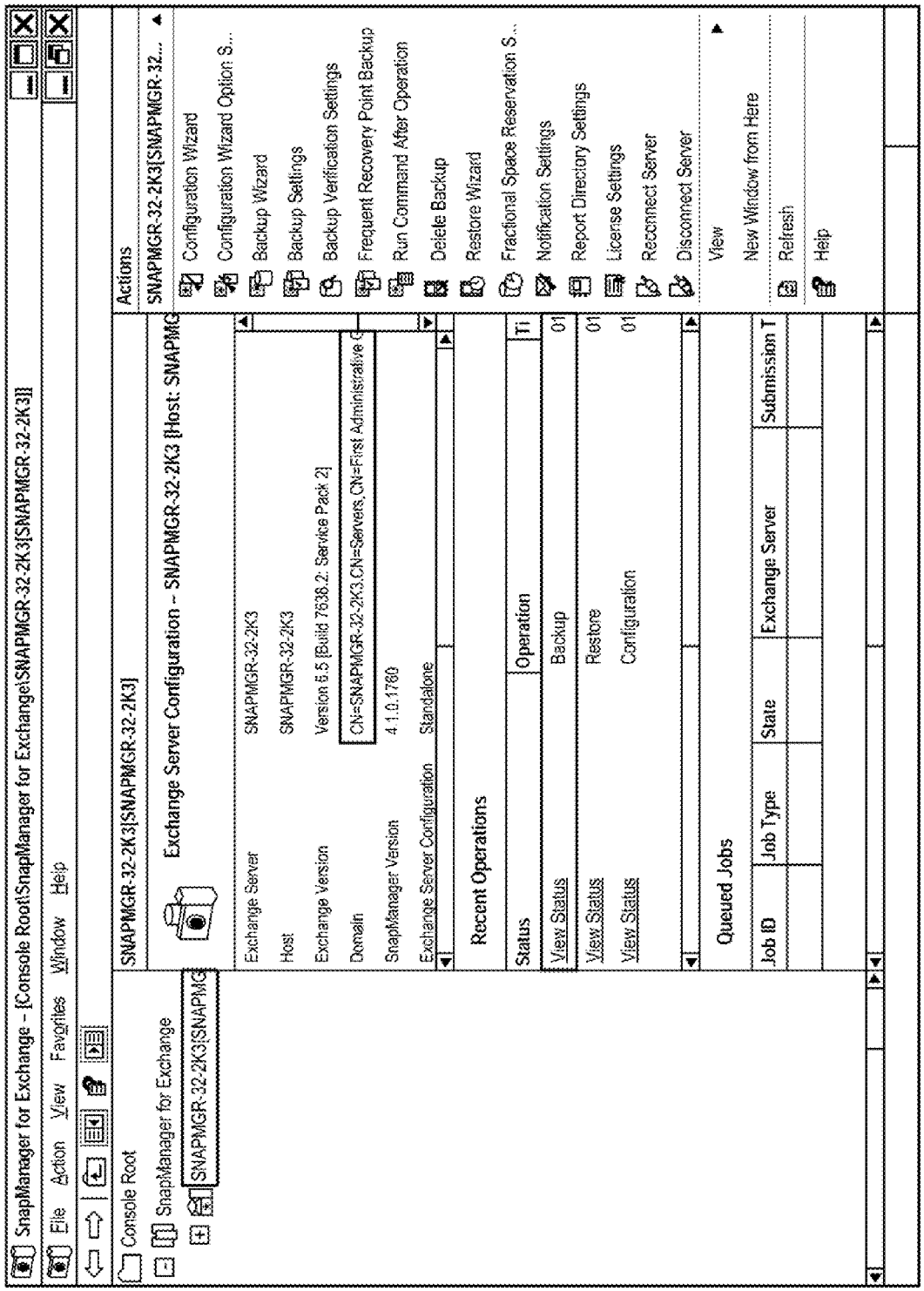
FIG. 5 illustrates an interface for scheduling a frequent recovery point backup, in accordance with one embodiment.

FIG. 5 illustrates an interface 500 for scheduling a frequent recovery point backup, in accordance with one embodiment. As an option, the interface 500 may be utilized in the context of the details of FIGS. 1-4. Of course, however, the interface 500 may be implemented in any desired environment. Again, the definitions provided above equally apply to the present description.

In operation, when a button or text on an interface corresponding to scheduling an FRP backup is selected, the interface 500 may be displayed to a user. Using the interface 500, the user may be presented with an option to display another interface for choosing the frequency of the FRP backup (e.g. from a drop down list, etc.). In this case, the user may be presented with many different frequency options. For example, the frequencies presented to the user may begin at 10 minutes and increment by 5 minutes up to 1 hour. After 1 hour, the frequencies may increment by 1 hour up to 24 hours.

Figure 6:
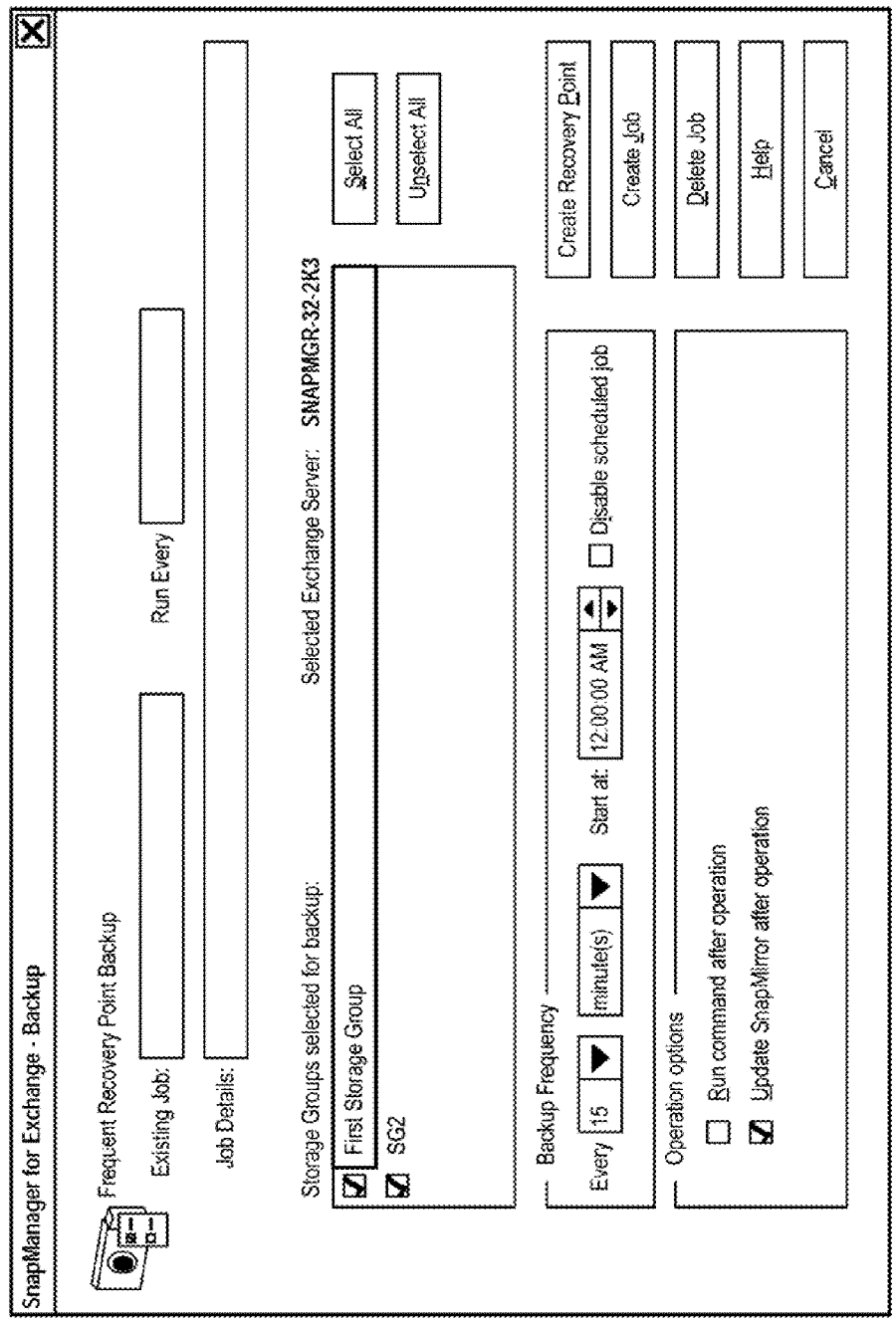
FIG. 6 illustrates an interface for configuring a frequent recovery point backup, in accordance with one embodiment.

FIG. 6 illustrates an interface 600 for configuring a frequent recovery point backup, in accordance with one embodiment. As an option, the interface 600 may be utilized in the context of the details of FIGS. 1-5. Of course, however, the interface 600 may be implemented in any desired environment. Further, the definitions provided above equally apply to the present description.

In operation, the interface 600 may be displayed to a user when an FRP backup operation is not yet scheduled and/or configured. In this case, the user may select a "Create Job" button and choose the data on which the FRP backup is to be performed (e.g. a first storage group, a second storage group, etc.).

Figure 7:
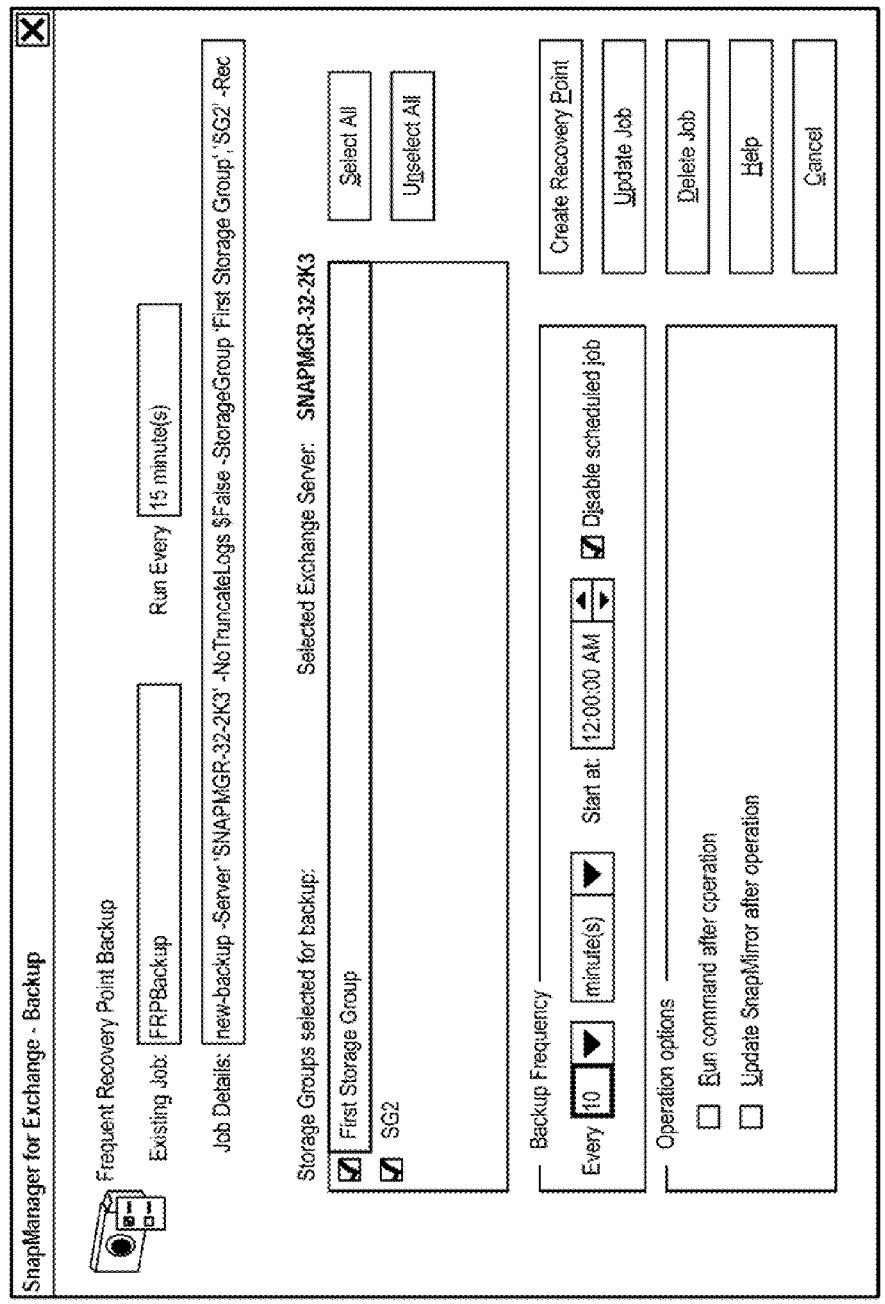
FIG. 7 illustrates an interface for display when a frequent recovery point backup job is configured, in accordance with one embodiment.

FIG. 7 illustrates an interface 700 for display when a frequent recovery point backup job is configured, in accordance with one embodiment. As an option, the interface 700 may be utilized in the context of the details of FIGS. 1-6. Of course, however, the interface 700 may be implemented in any desired environment. The definitions provided above equally apply to the present description.

In operation, the interface 700 may be displayed when an FRP backup scheduled job is already created. A user may select an "Update Job" button and the user may specify the data to backup and the frequency of the backup. As an option, the user may be required provide authentication information prior to configuring or implementing the FRP backup jobs/ frequencies.

Figure 8:
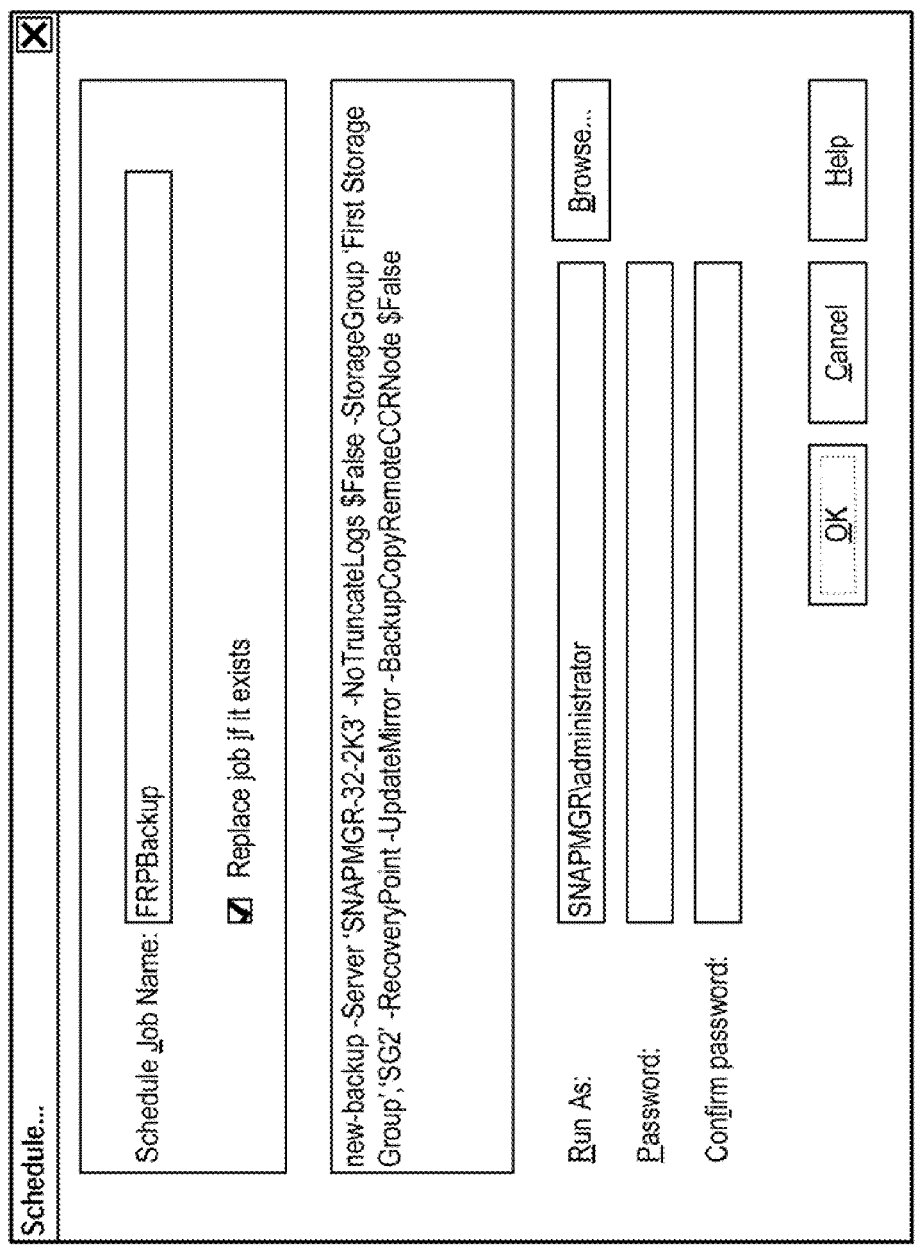
FIG. 8 illustrates an interface for authenticating a user prior to allowing the configuration or implementation of frequent recovery point backups, in accordance with one embodiment.

FIG. 8 illustrates an interface 800 for authenticating a user prior to allowing the configuration or implementation of FRP backups, in accordance with one embodiment. As an option, the interface 800 may be utilized in the context of the details of FIG. 6 or 7. Of course, however, the interface 800 may be implemented in any desired environment. Again, the definitions provided above equally apply to the present description.

In operation, once a user inserts the required authentication information, and selects the "OK" button, an FRP backup job with the selected frequency will be created. In one embodiment, the FRP backup job with the selected frequency may be created in a Windows Task Scheduler.

Figure 9:
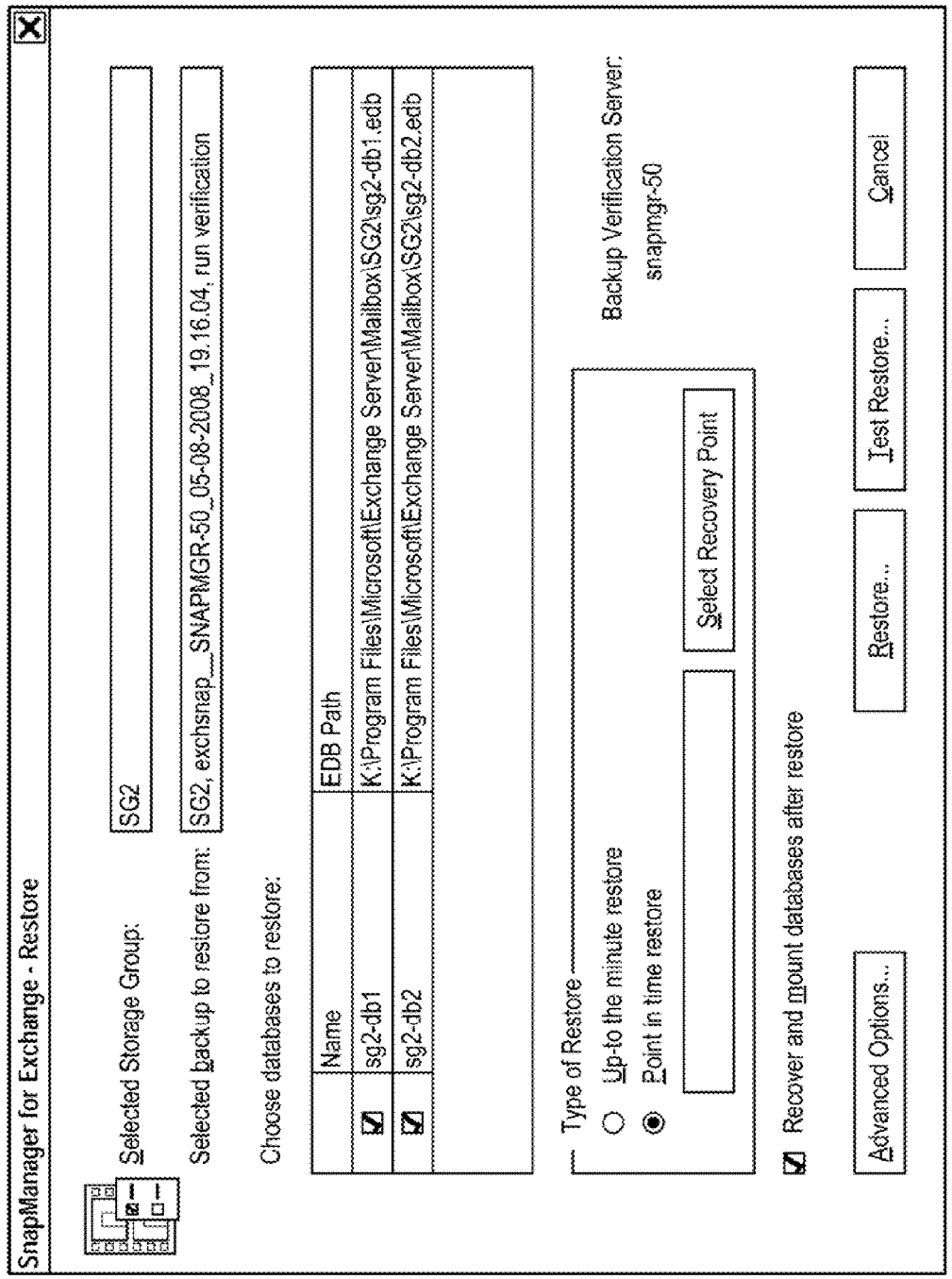
FIG. 9 illustrates an interface for restoring data to a full backup or a frequent recovery point backup state, in accordance with one embodiment.

FIG. 9 illustrates an interface 900 for restoring data to a full backup or an FRP backup state, in accordance with one embodiment. As an option, the interface 900 may be utilized in the context of the details of FIGS. 1-8. Of course, however, the interface 900 may be implemented in any desired environment. Furthermore, the definitions provided above equally apply to the present description.

As shown, the interface 900 may display a list of data that may be restored. A user may select data to restore from this list. Additionally, the user may select a "Point-In-Time" restore type button or a "Select Recovery Point" button. In this way, backup data may be recovered for a particular point in time, or from a particular backup state (e.g. a particular full backup state, an FRP backup state, etc.).

FIG. 10 illustrates an interface 1000 for selecting a recovery point, in accordance with one embodiment. As an option, the interface 1000 may be utilized in the context of the details of FIGS. 1-9. Of course, however, the interface 1000 may be implemented in any desired environment. Additionally, the definitions provided above equally apply to the present description.

As shown, the interface 1000 may present a user with an option to restore from a point in time or from a particular recovery point (e.g. an FRP point, etc.). In one embodiment, a default restore date presented to the user may be configured be the date when the selected full backup was created. As an option, when the user selects a box corresponding to the date, a small calendar window may be displayed. In this case, selecting any date before the default date may be defined as an error.

Figure 11:
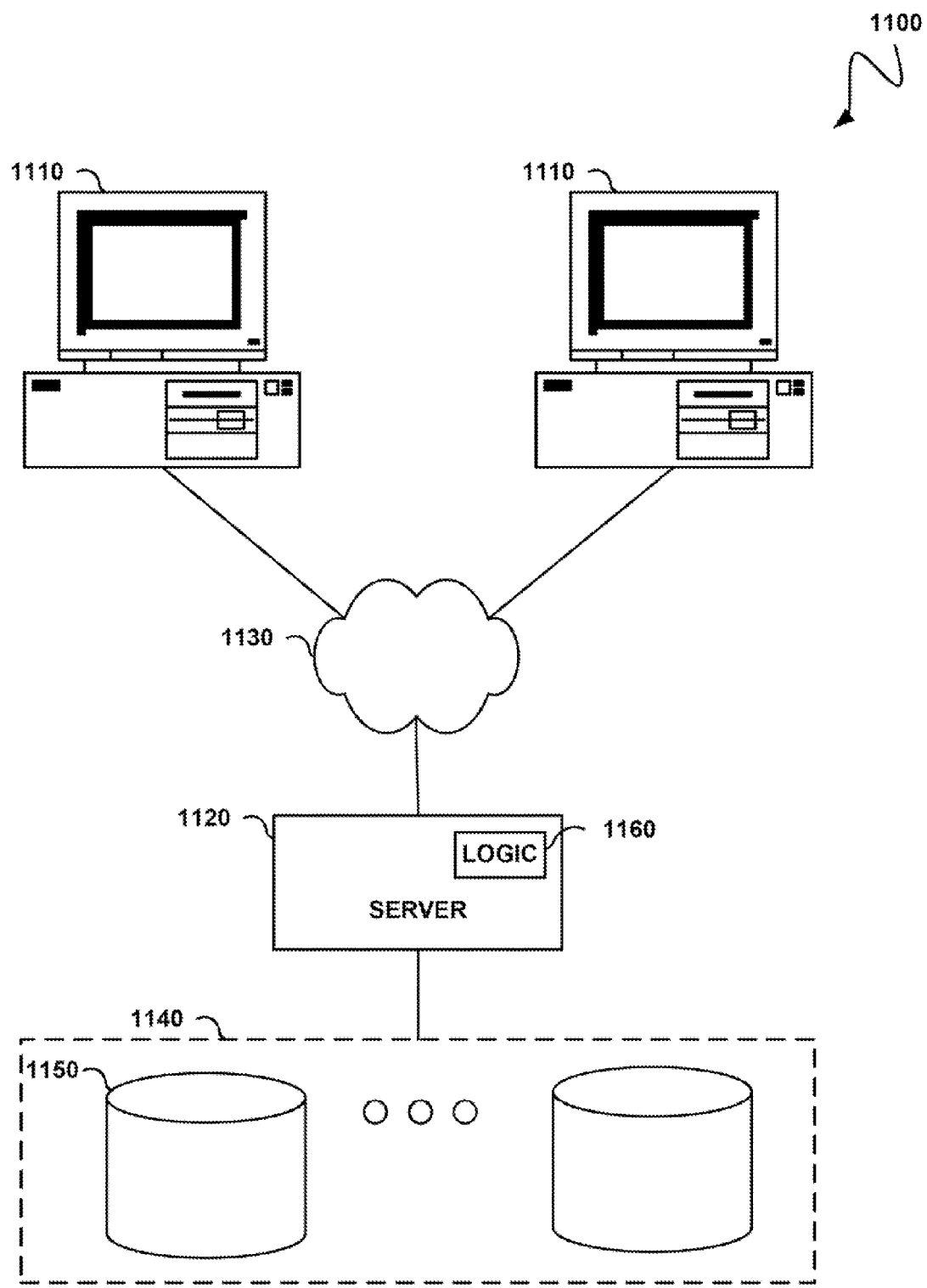
FIG. 11 is an illustration of a network environment in which an embodiment may be implemented.

FIG. 11 is an illustration of a network environment 1100 in which an embodiment may be implemented. As an option, the network environment 1100 may be implemented in the context of the storage system 200 of FIG. 2. Of course, however, it should be noted that the network environment 1100 may be used in any desired environment and incorporate any one or more of the features described in the previous figures.

Of course, the various embodiments described herein are not limited to any particular environment, and may be implemented in various storage processes. In the present illustration, the storage system includes a storage server, such as a server 1120. The server 1120 is coupled with a storage subsystem 1140, which includes a set of mass storage devices 1150, and to a set of clients 1110 through a network 1130, such as a local area network (LAN) or other type of network. Each of the clients 1110 may be, for example, a conventional personal computer (PC), workstation, or any other client.

The storage subsystem 1140 is managed by the server 1120. For example, the server 1120 may receive and respond to various read and write requests from the clients 1110, directed to data stored in or to be stored in the storage subsystem 1140. The mass storage devices 1150 in the storage subsystem 1140 may be, for example, magnetic disks, optical disks such as compact disks-read only memory (CD-ROM) or digital versatile/video disks (DVD)-based storage, magneto-optical (MO) storage, tape-based storage, or any other type of non-volatile storage devices suitable for storing large quantities of data.

Although the server 1120 is illustrated as a single unit in FIG. 11, it can have a distributed architecture. For example, the server 1120 can be implemented with multiple distributed storage servers. It can also include a physically separate network module (e.g., "N-module") and disk module (e.g., "D-module") (not shown), which communicate with other storage servers over an external interconnect. The N-module acts as a front-end of the server 1120, exporting services to clients; and the D-module acts as the back-end, managing the underlying storage of the server 1120. The N-module and D-module can be contained in separate housings and communicate with each other via network connections. Thus, the N-module and the D-module enable the server 1120 to be physically separated into multiple modules that can be distributed across a network.

In another embodiment, the server 1120 may have an integrated architecture, where the network and data components are all contained in a single box or unit. The server 1120 further may be coupled through a switching fabric to other similar storage systems (not shown) that have their own local storage subsystems. In this way, all of the storage subsystems can form a single storage pool, to which any client of any of the storage systems has access.

In one embodiment, the server 1120 may be equipped with hardware and/or software logic 1160 for carrying out the functionality of FIGS. 1-10. While, in the present embodiment, such logic 1160 is shown to be a component of the server 1120, it should be noted that it may reside elsewhere as well (e.g. exterior of the server 1120, etc.).

It should be noted that, in one embodiment, the server 1120 may represent the storage system 200 of FIG. 2. Furthermore, in another embodiment, the server 1120 and the storage subsystem 1140 may represent the storage system 200 of FIG. 2. Thus, the server 1120 and the storage subsystem 1140 may be configured to implement the functionality described in the context of the details of the storage system 200 of FIG. 2.

Figure 12:
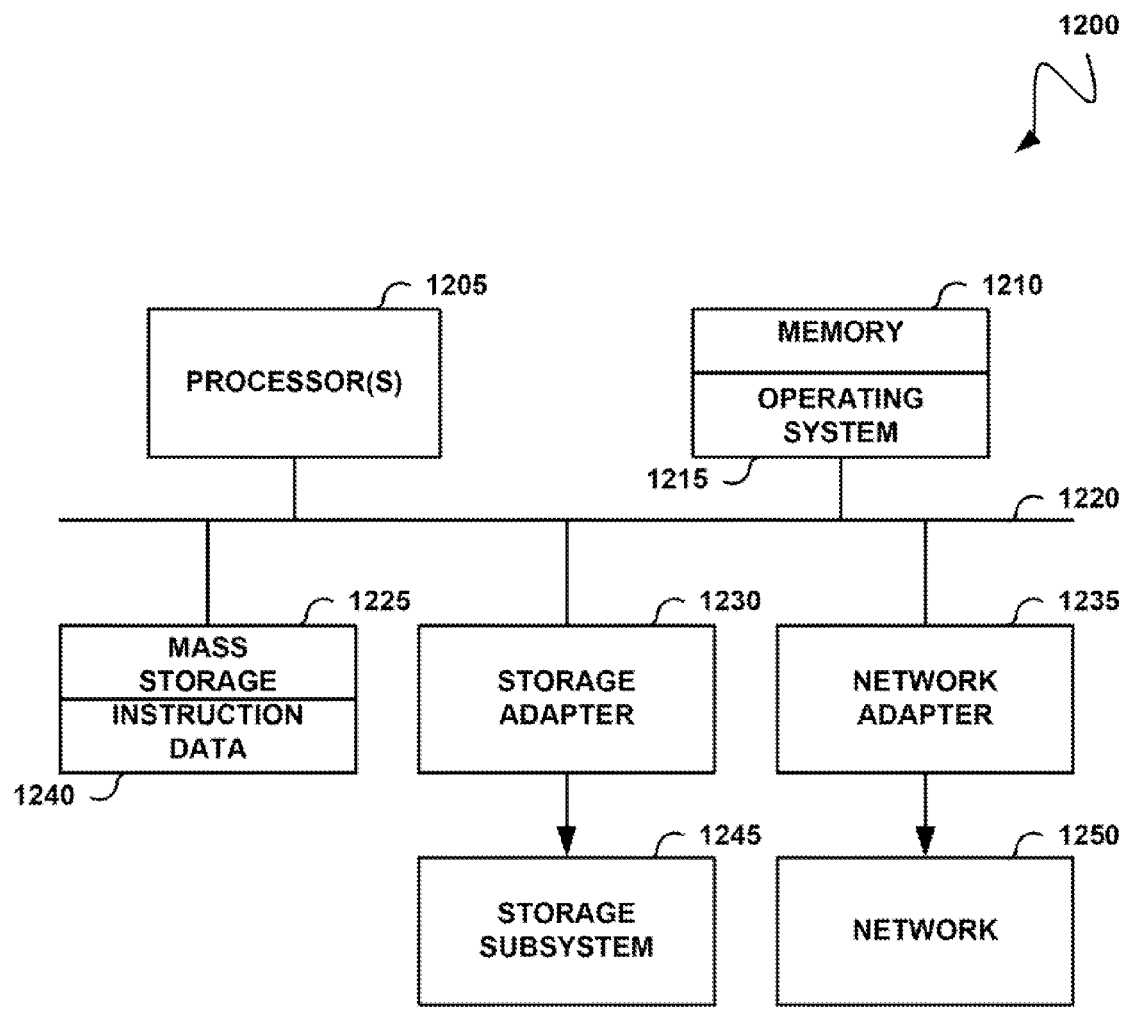
FIG. 12 is a block diagram illustrating architecture of a server that may include an embodiment.

FIG. 12 is a block diagram illustrating architecture of a server 1200 that may include an embodiment. In one embodiment, the server 1200 may represent the server 1120 of FIG. 11. Of course, however, it should be noted that the server 1200 may be implemented in any desired environment and incorporate any one or more of the features described in the previous figures.

The server 1200 includes one or more processors 1205 and memory 1210 coupled to a interconnect 1220. The interconnect 1220 shown in FIG. 12 is an abstraction that represents any one or more separate physical buses, point-to-point connections, or both connected by appropriate bridges, adapters, or controllers. The interconnect 1220, therefore, may include, for example, a system bus, a Peripheral Component Interconnect (PCI) bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, sometimes referred to as "Firewire".

The processor(s) 1205 may include central processing units (CPUs) of the server 1200 and, thus, control the overall operation of the server 1200. In certain embodiments, the processor(s) 1205 accomplish this by executing software stored in memory 1210. The processor(s) 1205 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

The memory 1210 is or includes the primary memory of the server 1200. The memory 1210 represents any form of random access memory (RAM), read-only memory (ROM), flash memory, or the like, or a combination of such devices. In use, the memory 1210 stores, among other things, the operating system 1215 of the server 1200.

Also connected to the processor(s) 1205 through the interconnect 1220 may be one or more internal mass storage devices 1225, a storage adapter 1230 and a network adapter 1235. The internal mass storage devices 1225 may be or include any medium for storing large volumes of instructions and data 1240 in a non-volatile manner, such as one or more magnetic or optical-based disks. The storage adapter 1230 allows the server 1200 to access a storage subsystem 1245 and may be, for example, a Fibre Channel adapter or a SCSI adapter. The storage adapter 1230 may interface with a D-module portion of the server. The network adapter 1235 provides the server 1200 with the ability to communicate with remote devices, such as clients, over a network 1250 and may be, for example, an Ethernet adapter. The network adapter 1235 may interface with an N-module portion of the server 1200.

Figure 13:
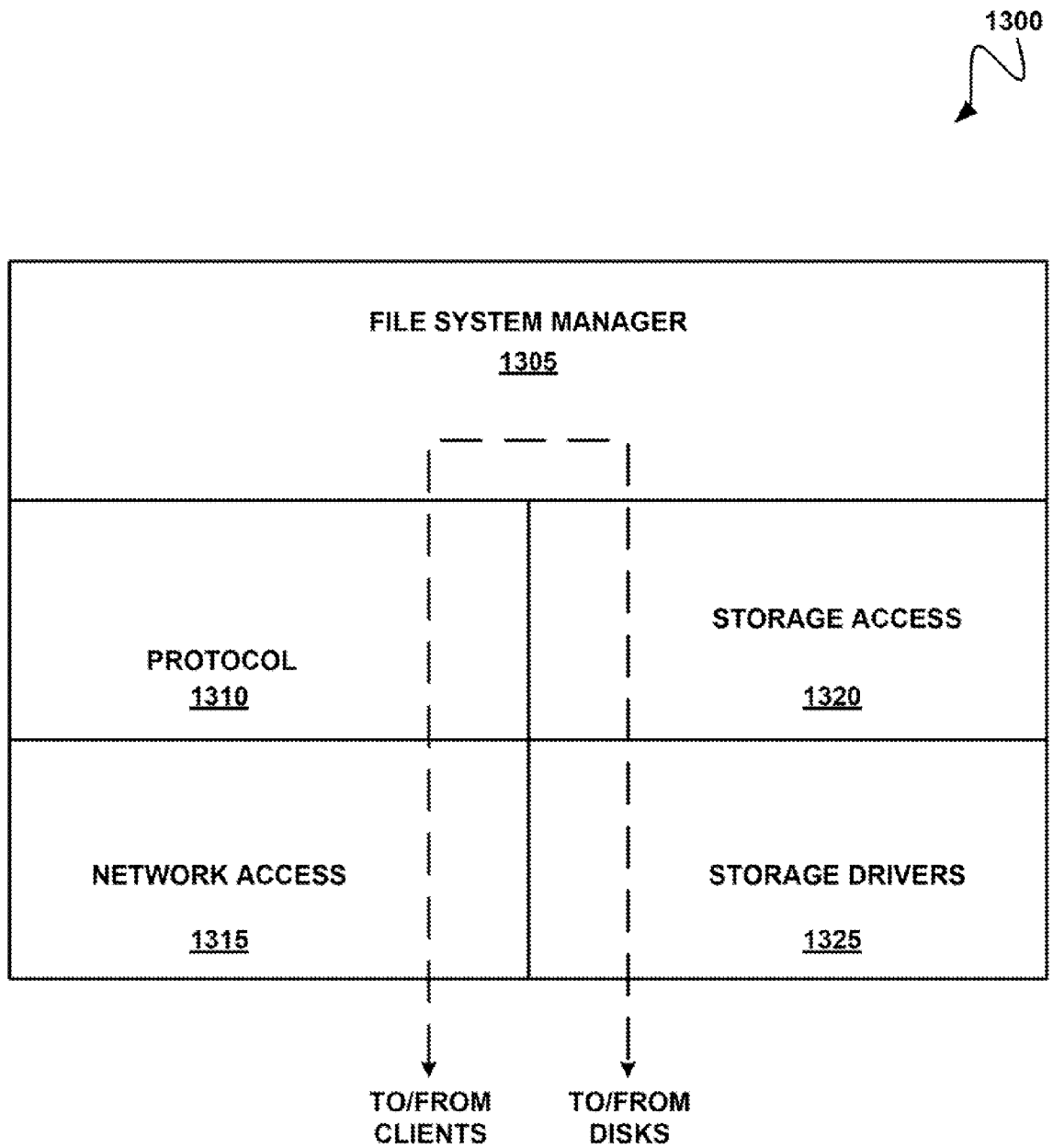
FIG. 13 illustrates an example of the operating system of a server according to one possible embodiment.

FIG. 13 illustrates an example of the operating system 1300 of a server according to one possible embodiment. As an option, the operating system 1300 may be installed on the server 1200 of FIG. 12. Of course, however, it should be noted that the operating system 1300 may be used in any desired environment and incorporate any one or more of the features described in the previous figures.

As shown, the operating system 1300 includes several modules, or "layers." These layers include a file system manager 1305. The file system manager 1305 is software that keeps track of the directory structure (hierarchy) of the data stored in a storage subsystem and manages read/write operations on the data (i.e. executes read/write operations on the disks in response to client requests).

The operating system 1300 also includes a protocol layer 1310 and an associated network access layer 1315, to allow a server to communicate over a network to other systems, such as clients. The protocol layer 1310 implements one or more of various higher-level network protocols, such as Network File System (NFS), Common Internet File System (CIFS), Hypertext Transfer Protocol (HTTP) and/or Transmission Control Protocol/Internet Protocol (TCP/IP). The network access layer 1315 includes one or more drivers, which implement one or more lower-level protocols to communicate over the network, such as Ethernet. Interactions between clients and mass storage devices (e.g. disks, etc.) are illustrated schematically as a path, which illustrates the flow of data through the operating system 1300.

The operating system 1300 further includes a storage access layer 1320 and an associated storage driver layer 1325 to allow a server to communicate with a storage subsystem. The storage access layer 1320 implements a higher-level disk storage protocol, such as RAID, while the storage driver layer 1325 implements a lower-level storage device access protocol, such as Fibre Channel Protocol (FCP) or SCSI. In one embodiment, the storage access layer 1320 may implement a RAID protocol, such as RAID-4 or RAID-DP™ (RAID double parity for data protection provided by Network Appliance, Inc.), and therefore may alternatively be referred to as RAID layer.

The foregoing description has set forth only a few of the many possible implementations. For this reason, this detailed description is intended by way of illustration, and not by way of limitations. Variations and modifications of the embodiments disclosed herein may be made based on the description set forth herein, without departing from the scope and spirit of the present application. Furthermore, the data structures discussed herein can be the same or different data structures in accordance with various embodiments of the invention.

It is only the following claims, including all equivalents, that are intended to define the scope of the various embodiments. Moreover, the embodiments described above are specifically contemplated to be used alone as well as in various combinations. Accordingly, other embodiments, variations, and improvements not described herein are not necessarily excluded.

What is claimed is:

1. A method, comprising;
identifying data to backup;
performing one or more full backup operations on the data;
performing one or more recovery point backup operations on a new portion of the data, where the new portion of the data is present after the performance of the one or more full backup operations;
associating the one or more recovery point backup operations with at least one of the one or more full backup operations;
allowing access to backup data resulting from performance of the one or more recovery point backup operations and the one or more full backup operations; and
storing the backup data in a data structure embodied on a tangible computer readable medium;
wherein associating the one or more recovery point backup operations with at least one of the one or more full backup operations includes associating a pass identifier with each of the one or more recovery point backup operations, where the pass identifier is utilized to trace which transaction logs to copy over in each backup operation;
wherein the one or more full backup operations on the data include a first full backup operation performed on the data, and a second full backup operation is performed on the data in addition to the new portion of the data;
wherein a first restore operation is performed by restoring the backup data resulting from the performance of the first full backup operation;
wherein a third full backup operation is performed on the backup data accessed during the first restore operation and another portion of the data other than the new portion of the data in the second full backup operation, the other portion of the data present after the performance of the first restore operation;
wherein a second restore operation is performed by accessing the backup data resulting from the performance of the second full backup operation, after performing the third full backup operation;
wherein a first restore path is created between the first full backup operation and the second full backup operation, and a second restore path separate from the first restore path is created between the first full backup operation and the third full backup operation.

2. The method of claim 1, wherein the data includes the transaction logs.

3. The method of claim 2, wherein the one or more full backup operations include truncating the transaction logs.

4. The method of claim 1, wherein the one or more recovery point backup operations are performed at predefined time intervals.

5. The method of claim 4, wherein the predefined time intervals are defined by a user.

6. The method of claim 1, wherein the one or more recovery point backup operations are performed in response to a change in the data.

7. The method of claim 1, wherein the pass identifier indicates one of the full backup operations corresponding to the one or more recovery point backup operations.

8. The method of claim 1, wherein the pass identifier is utilized to allow access to the backup data.

9. The method of claim 1, further comprising performing a recovery operation after the performing of the one or more recovery point backup operations.

10. The method of claim 9, wherein the performance of the recovery operation enables access to the backup data by recovering the backup data.

11. The method of claim 9, wherein the recovery operation is a point in time recovery operation.

12. The method of claim 9, wherein the recovery operation allows access to a backup state.

13. The method of claim 1, wherein the backup data to be accessed is defined by a user.

14. The method of claim 1, wherein allowing access to the backup data includes allowing access to first backup data stored before second backup data.

15. The method of claim 14, wherein the first backup data is associated with the first full backup operation of the one or more full backup operations and the second backup data is associated with the second full backup operation.

16. The method of claim 1, wherein allowing access to the backup data includes recovering the backup data.

17. The method of claim 1, wherein allowing access to the backup data includes transferring the backup data from a backup storage location.

18. The method of claim 1, wherein allowing access to the backup data includes allowing the backup data to be read and modified.

19. The method of claim 1, wherein a number of the recovery point backup operations to be performed is defined by a user.

20. The method of claim 1, wherein each of the one or more recovery point backup operations is performed after an associated full backup operation.

21. A computer program product embodied on a non-transitory computer readable medium, comprising:
  computer code for identifying data to backup;
  computer code for performing one or more full backup operations on the data;
    computer code for performing one or more recovery point backup operations on a new portion of the data, where the new portion of the data is present after the performance of the one or more full backup operations;
  computer code for associating the one or more recovery point backup operations with at least one of the one or more full backup operations;
    computer code for allowing access to backup data resulting from performance of the one or more recovery point backup operations and the one or more full backup operations; and
    computer code storing the backup data in a data structure;
  wherein the computer code for associating the one or more recovery point backup operations with at least one of the one or more full backup operations includes computer code for associating a pass identifier with each of the one or more recovery point backup operations, where the pass identifier is utilized to trace which transaction logs to copy over in each backup operation;
  wherein the one or more full backup operations on the data include a first full backup operation performed on the data, and a second full backup operation is performed on the data in addition to the new portion of the data;
  wherein the computer program product is operable such that a first restore operation is performed by restoring the backup data resulting from the performance of the first full backup operation;
  wherein the computer program product is operable such that a third full backup operation is performed on the backup data accessed during the first restore operation and another portion of the data other than the new portion of the data in the second full backup operation, the other portion of the data present after the performance of the first restore operation;
  wherein the computer program product is operable such that a second restore operation is performed by accessing the backup data resulting from the performance of the second full backup operation, after performing the third full backup operation;
  wherein the computer program product is operable such that a first restore path is created between the first full backup operation and the second full backup operation, and a second restore path separate from the first restore path is created between the first full backup operation and the third full backup operation.

22. A system, comprising:
  one or more processors configured to identify data to backup, perform one or more full backup operations on the data, perform one or more recovery point backup operations on a new portion of the data, where the new portion of the data is present after the performance of the one or more full backup operations, associate the one or more recovery point backup operations with at least one of the one or more full backup operations, and allow access to backup data resulting from performance of the one or more recovery point backup operations and the one or more full backup operations;
  wherein associating the one or more recovery point backup operations with at least one of the one or more full backup operations includes associating a pass identifier with each of the one or more recovery point backup operations, where the pass identifier is utilized to trace which transaction logs to copy over in each backup operation;
  wherein the one or more full backup operations on the data include a first full backup operation performed on the data, and a second full backup operation is performed on the data in addition to the new portion of the data;
  wherein the system is operable such that a first restore operation is performed by restoring the backup data resulting from the performance of the first full backup operation;
  wherein the system is operable such that a third full backup operation is performed on the backup data accessed during the first restore operation and another portion of the data other than the new portion of the data in the second full backup operation, the other portion of the data present after the performance of the first restore operation;
  wherein the system is operable such that a second restore operation is performed by accessing the backup data resulting from the performance of the second full backup operation, after performing the third full backup operation;
  wherein the system is operable such that a first restore path is created between the first full backup operation and the second full backup operation, and a second restore path separate from the first restore path is created between the first full backup operation and the third full backup operation.

23. A method, comprising:
  generating an association between one or more recovery point backup operations and at least one full backup operation;
  storing the association information in a file;

retrieving backup data corresponding to a user selected backup point, the backup data being retrieved based on the association information saved in the file; and restoring a storage system in accordance with the user selected backup point by transferring the backup data from a backup storage location to a system;

wherein the association between the one or more recovery point backup operations and the at least one full backup operation includes an association of a pass identifier with each of the one or more recovery point backup operations, where the pass identifier is utilized to trace which transaction logs to copy over in each backup operation;

wherein the at least one full backup operation includes a first full backup operation performed on system data, and a second full backup operation is performed on the system data in addition to a new portion of the system data present after the performance of the first full backup operation;

wherein the system is operable such that a first restore operation is performed by restoring the backup data resulting from the performance of the first full backup operation;

wherein the system is operable such that a third full backup operation is performed on the system backup data accessed during the first restore operation and another portion of the system data other than the new portion of the system data in the second full backup operation, the other portion of the system data present after the performance of the first restore operation;

wherein the system is operable such that a second restore operation is performed by accessing the backup data resulting from the performance of the second full backup operation, after performing the third full backup operation;

wherein the system is operable such that a first restore path is created between the first full backup operation and the second full backup operation, and a second restore path separate from the first restore path is created between the first full backup operation and the third full backup operation.

24. The method of claim 1, wherein the pass identifier identifies a path in a data structure associated with a particular series of backup operations.

25. The method of claim 1, wherein the pass identifier includes metadata for associating the one or more recovery point backup operations with at least one of the one or more full backup operations.

26. The method of claim 1, wherein performing the one or more full backup operations includes storing a copy of data in databases, storing the transaction logs, and storing metadata associated with the transaction logs.

27. The method of claim 1, wherein every time a restore operation is performed, an xml file including a restored backup name is created or updated.

28. The method of claim 1, wherein every time a restore operation is performed, an exclusive-backup list file is created that includes a list of backups that are excluded from future restore operations.

* * * * *